MONOSTABLE MULTIVIBRATOR WHEREIN INPUT APPLIED VIA FIRST TRANSISTOR TURNS ON SECOND TRANSISTOR WHICH TURNS OFF FIRST TRANSISTOR

Filed Oct. 6, 1964

INVENTOR.
KENNETH SHARPLES
BY Robert J. Schiller
ATTORNEY

United States Patent Office 3,320,436
Patented May 16, 1967

3,320,436

MONOSTABLE MULTIVIBRATOR WHEREIN INPUT APPLIED VIA FIRST TRANSISTOR TURNS ON SECOND TRANSISTOR WHICH TURNS OFF FIRST TRANSISTOR

Kenneth Sharples, South Braintree, Mass., assignor to Gordon Engineering Corp., Watertown, Mass., a corporation of Massachusetts Filed Oct. 6, 1964, Ser. No. 401,823
9 Claims. (Cl. 307—88.5)

Figure 1:
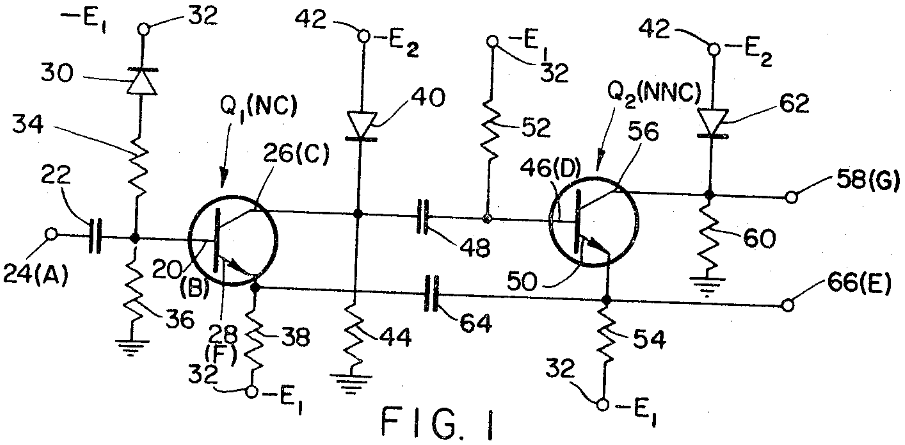

This invention relates to electronic pulse or wave shaping devices and more particularly to an amplifying monostable multivibrator.

In certain digital electronic devices, the information with which they are concerned is in the form of low level signals, i.e., in the range of a few millivolts. For example, the information may be in the form of a signal directly provided by a low level digital transducer, or may be in the form of data retrieved or transferred as low level signals as from a storage system or memory. In a specific instance, information stored in magnetic media, such as a tape or the like, is retrievable through the use of a magnetic reading head at signal potential amplitudes generally around 5 millivolts. Signals read by photoelectric transducers from punched media, such as cards or the like, are similarly low level signals ranging from about 1 or 2 millivolts up to about 20. Unfortunately, these signals are generally accompanied by comparatively high noise levels (typically a 60-cycle hum) which can approximate up to one-half of the amplitude of the desired signal. Ordinarily, retrieval of such signals and shaping thereof for entry into other digital apparatus such as computer devices, is accomplished in a fairly cumbersome manner involving a large and expensive amount of equipment.

For example, retrieval is usually done by first amplifying the low level signals with a low level preamplifier. Generally, the latter includes means for rejecting any 60-cycle component which is usually the largest noise factor. The amplified, filtered signal is then fed to a shaper, much as a Schmitt-type circuit. The preamplifier necessarily should have sufficient gain to trigger the Schmitt circuit. The output of the shaper is then differentiated, as by a simple RC circuit, and the ouput of the latter, is fed to means such as a conventional one-shot or monostable multivibrator, to provide a pulse output of a proper form factor, i.e., of desired width and amplitude.

It is, therefore, a principal object of the present invention to provide a simple, inexpensive circuit for retrieving low level signals from storage media and for amplifying and shaping the retrieved signals to provide an output signal pulse form of predetermined width and amplitude.

Another important object of the present invention is to provide an amplifying monostable multivibrator adapted to be triggered by low level signals retrieved from storage media which multivibrator incorporates a single regenerative circuit for achieving amplification and pulse shaping.

Other objects of the present invention are to provide such an amplifying, monostable multivibrator which requires as its active elements only two transistors; to provide a multivibrator of the type described which is adapted to accept an input signal of a few millivolts and which is capable of providing therefrom an output signal having an amplitude of several volts and duration of several microseconds; to provide a multivibrator of the type described which comprises an input amplification stage, an output amplification stage which is adapted to be switched on by the input stage, and a regenerative feedback loop so coupled reactively between the input and output stages that when the output stage operates, a signal along said loop inhibits operation of the first stage for a period determined by the time constant of the feedback loop; and to provide such a multivibrator wherein the amplification stages are each unit transistors operating in a non-saturating mode.

Figure 2:
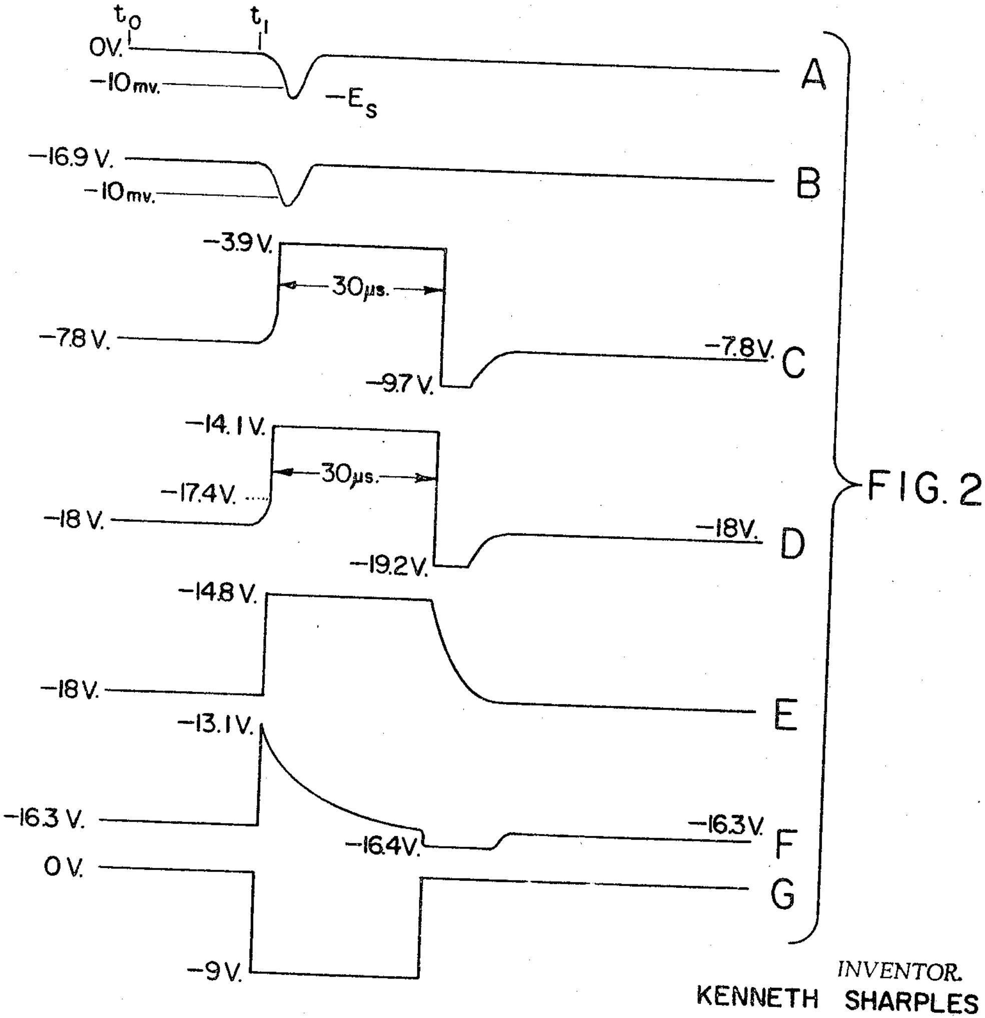

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

FIG. 1 is a schematic circuit diagram of an amplifying monostable multivibrator embodying the principles of the present invention; and FIG. 2 is a graphical representation of signal waveforms at various points in the circuit of FIG. 1 during operation of that circuit.

A monostable multivibrator, known also as a "one-shot" or "delay flop," is characterized basically in having one stable operating state, and can be fired or triggered into a second operating state which is quasi-stable. The monostable multivibrator will remain in the latter state only for a predetermined relaxation time, at the end of which the circuit resumes its stable state. A typical monostable multivibrator formed of transistors has cross-coupling networks between the bases and collectors of both transistors, only one such network permitting A.C. coupling.

Referring now to FIG. 1, it will be seen that the circuit of the invention includes a first three-terminal amplifying element or transistor, having its control terminal, e.g., base 20, coupled through a filter reactance such as capacitor 22, to input terminal 24 of the circuit. Transistor $Q_1$ in the form shown is an npn-type transistor which also includes collector 26 and emitter 28. As means for biasing transistor $Q_1$ into a normally conductive state, there are included unilateral current conducting means, such as diode 30, having its cathode connected to terminal 32 and its anode connected through series resistor 34 to base 20. Base 20 is also connected to ground through resistor 36 while emitter 28 is coupled through resistor 36 to another terminal 32. Terminals 32 are adapted to be connected to a negative potential $-E_1$ of appropriate amplitude.

The circuit includes clamp diode 40 having its anode connected to terminal 42 and its cathode connected to collector 26 and through resistor 44 to ground. A second three-terminal amplifying element is also included in the form of transistor $Q_2$ (also shown as an npn-type transistor) having its base 46 A.C. coupled, as through capacitor 48, to collector 26 of transistor $Q_1$. Base 46 and emitter 50 of transistor $Q_2$ are connected respectively through resistors 52 and 54 to yet other terminals 32. Collector 56 of transistor $Q_2$ is connected to output terminal 58 and also through resistor 60 to system ground. Clamping diode 62 is provided having its anode connected to another terminal 42 and its cathode connected to collector 56. Terminals 42 are adapted to be connected to a second negative potential $-E_2$ of lesser magnitude than $-E_1$.

The emitters of both transistors are A.C. coupled to one another, as by capacitor 64, to provide a regenerative feed-back path from transistor $Q_2$ to transistor $Q_1$. Emitter 50 of transistor $Q_2$ is connected to alternative output terminal 66.

In order to clarify the description of the operation of the circuit of FIG. 1, an exemplary embodiment thereof using silicon transistors and diodes is described, although germanium or other semiconductor materials can be used if desired. The following circuit values are also useful for purposes of this description:

| | | |
|---|---|---|
| $-E_1$ | volts | $-18$ |
| $-E_2$ | do | $-9$ |
| Capacitor **22** | μf | 0.01 |
| Capacitor **48** | μf | 0.01 |
| Capacitor **64** | pf | 5900 |
| Resistor **34** | KΩ | 12 |
| Resistor **36** | KΩ | 430 |
| Resistor **38** | KΩ | 2.4 |
| Resistor **44** | KΩ | 39 |
| Resistor **52** | KΩ | 220 |
| Resistor **54** | | 510Ω |
| Resistor **60** | KΩ | 10 |

Assuming that the input signal's amplitude for the retrieved pulse as shown in FIG. 2A varies from ground or zero to $-20$ mv. peak amplitude, the circuit of FIG. 1 is intended to be fired or triggered by signals applied at terminal 24 which exceed $10\frac{1}{2}\pm1\frac{1}{2}$ mv., thus rejecting signals below 9 mv. approximately. As will be seen in FIG. 2G, the output signal of the circuit available at terminal 58 is a pulse having base and peak values of 0 and $-9$ volts respectively, and being of approximately 30 microseconds' duration.

The operation of this exemplary embodiment can be analyzed by considering three circuit conditions, the static condition or stable state of the circuit, and the linear and cutoff conditions which constitute the quasi-stable state of the circuit. To this end, the various waveforms of FIG. 2, in which the horizontal axis is a time axis, identify the changes in potential at various points in the circuit as follows:

| | Point |
|---|---|
| FIG. 2A | **24** |
| FIG. 2B | **20** |
| FIG. 2C | **26** |
| FIG. 2D | **46** |
| FIG. 2E | **66** |
| FIG. 2F | **28** |
| FIG. 2G | **58** |

By virtue of the networks formed by resistors 34, 36, and 38 and diode 30, during the stable state of the circuit, transistor $Q_1$ is in conduction and the collector current is about 200 microamperes at time $t_0$. No signal is present at terminal 24, and diode 30 is forward biased by the negative potential at its cathode and therefore conducts. The diode is selected to provide temperature stabilization, i.e., the forward resistance of the diode drops a voltage equal to $V_{BE}$ of transistor $Q_1$ at all operating temperatures. It will be seen that the base and the collector of transistor $Q_1$ are respectively at $-16.9$ and $-7.8$ volts. Thus, the collector-base junction is reverse-biased, the base-emitter junction is forward-biased, and transistor $Q_2$ is in a conductive state where current flows in its base-emitter and collector-emitter circuits. At the same time, transistor $Q_2$ is held in its non-conductive or "off" condition since both emitter 50 and base 46 are returned to $-E_1$ while collector 56 sits at ground potential.

Now, as shown in FIG. 2A at $t_1$, a negative-going input pulse $-E_s$ of about 20 mv. is applied at terminal 24. During the time from the start of $-E_s$ to the beginning of regeneration, the circuit of FIG. 1 is in its linear condition. As the output of transistor $Q_1$ changes responsively to $-E_s$, capacitor 64 bypasses resistor 38 so that current flow occurs through the much lower resistance of resistor 54.

In order to switch transistor $Q_2$ into conduction, where the circuit values are as given in this example, it has been determined empirically that the threshold potential at base 46 need be changed by about 0.6 volt. It can be shown that during linear conditions, the voltage gain in the circuit before transistor $Q_2$ conducts has risen to a value which typically is about 58 due to the bypass of the emitter current of transistor $Q_1$ by capacitor 64. The input transient signal, as amplified, changes the voltage of collector 26 toward $-7.2$ volts and thus, as applied through capacitor 48, alters the potential on base 46 toward $-17.4$ volts. When the input signal $-E_s$ has moved about $-10.5$ mv., transistor $Q_2$ will begin to conduct. The threshold voltage on the base of transistor $Q_2$ can be varied by providing a vernier voltage divider in series with resistor 52. Such a voltage divider could vary the base bias on transistor $Q_2$ to $-E_1\pm\Delta E$. Then the magnitude of $-E_s$ required to trigger transistor $Q_2$ into conduction would vary by $\pm\Delta E/K$ where K is the voltage gain from the base of transistor $Q_1$ to the base of transistor $Q_2$.

As transistor $Q_2$ begins to conduct, its emitter voltage starts moving toward a poistive potential, as shown in FIG. 2E. This change is coupled through feedback capacitor 64 to the emitter of transistor $Q_1$ as seen in FIG. 2F. Since the feedback is regenerative, emitter 28 is very quickly driven to a more positive voltage which back-biases transistor $Q_1$, turning the latter "off."

When the circuit is in this cutoff condition, transistor $Q_2$ is heavily in conduction. Because transistor $Q_2$ is in emiter follower configuration, its emitter voltage very closely tracks any change in signal at its base. It will be noted that conveniently, the input impedance to base 46 is approximately equal to the resistance of collector resistor 44. Therefore, due to $-E_s$ and the shut-off of transistor $Q_1$ there is a step voltage change of about 3.9 volts in the potential on base 46, and the base voltage rises to about $-14.1$ volts. If the reactance of capacitor 48 is large enough, the base of transistor $Q_2$ will be held at about this voltage level without much decay, at least over the time period chosen for the pulse duration of the multivibrator output.

As the base voltage rises from the $-18$ volt level to $-14.1$ volts as seen in FIG. 2D the emitter voltage of transistor $Q_2$ will track closely as shown in FIG. 2E. Since there is about 0.7 volt drop from base to emitter, the emitter voltage will peak at about $-14.8$ volts, moving to this level in step fashion from the original $-18$ volt level. This swing of 3.2 volts is reflected (in inverted form) by a change in voltage of collector 56 from ground in a negative direction as shown in FIG. 2G. Diode 62, of course, serves to limit any negative-going swing of the collector voltage to a maximum level around $-9$ volts, or some other desired value.

Emitter 28 being coupled through capacitor 64 will move through about the same voltage swing and peak at about $-13.1$ volts. The transient signal $-E_s$ having now ended, the base voltage on transistor $Q_1$ has returned to the $-16.9$ volt level as shown in FIG. 2B and transistor $Q_1$ is held off strongly. However, although the potential at emitter 50 is held at $-14.8$ volts by the base voltage, the voltage on emitter 28 now tends to drop toward its $-16.3$ volt base level at a rate governed by the time constant of the feedback loop. Where, as in this example, the output pulse is to be about 30 microseconds, the time constant established substantially by the values of capacitor 64 and resistor 38, should be set at about 15 microseconds. This is because transistor $Q_1$ will begin to conduct again when its emitter voltage drops to $-16.4$ volts and about two time constants will elapse before this level is reached.

As transistor $Q_1$ turns "on" again, its collector current pulls the base of transistor $Q_2$ negatively, abruptly turning $Q_2$ "off." The voltage of collector 56 rises in a step to ground terminating the output pulse at terminal 58. As transistor $Q_1$ turns "on," capacitor 64 discharges through the transistor and aids the turn-"on," process. It will be seen that diode 40 provides a low impedance path for rapid discharge of capacitor 64. Diode 40 also serves to keep transistor $Q_1$ out of saturation during the capacitor discharge, and further serves to clamp collector 26 at a voltage (−9 volts in this case) close to its original quiescent voltage (of −7.8 volts) in such manner as to leave a small postive charge on capacitor 48 which decays when no longer important. If a negative charge is left on the latter, it will tend to drive transistor $Q_2$ into conduction and the circuit will oscillate.

It will be apparent that at terminal 66 one can obtain a pulse waveform which is inverted with respect to the waveform obtainable at terminal 58. The output signal can be taken at either terminal at reasonable load currents without affecting either the timing or the threshold of the circuit.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An amplifying multivibrator having input and output terminals and comprising, in combination:
   - a first transistor having a base, emitter, and collector, said base being coupled to said input terminal;
   - means for providing a first bias level which normally holds said first transistor in conduction;
   - a second transistor having a base emitter and collector, said output terminal being connected to one of said emitter and collector;
   - means coupling the collector of said first transistor to the base of said second transistor;
   - means for providing a second bias level on the base and emitter of said second transistor at substantially the same voltage so as normally to hold said second transistor out of conduction;
   - a regenerative feedback loop including a series capacitance connecting the emitters of said transistors;
   - said bias levels being established so that when a pulse signal at a magnitude above a predetermined level is applied to said input terminal, the resulting voltage change on the collector of said first transistor is sufficient to overcome said second bias level and trigger said second transistor into conduction, and so that feedback along said loop from the conducting second transistor is sufficient to overcome said first bias level and force said first transistor into a non-conductive state for a period of time determined by the time constant of the feedback loop.

2. An amplifying multivibrator as defined in claim 1 wherein the collector of said first transistor is connected to system ground through a resistive impedance having substantially the same magnitude as the input impedance to the base of said second transistor.

3. An amplifying multivibrator as defined in claim 2 wherein the collector of said first transistor is connected to unilateral current conduction means for clamping said collector at a voltage having the same order of magnitude of and being greater than the voltage normally present at said collector during conduction of said first transistor in the absence of an input pulse signal at said input terminal.

4. An amplifying multivibrator as defined in claim 1 wherein each emitter of each said transistors is connected through a corresponding resistor to substantially the same bias voltage level, said corresponding resistor connected to the emitter of said second transistor being smaller than the other said corresponding resistor by at least an order of magnitude.

5. An amplifying multivibrator as defined in claim 1 wherein said means for providing said bias level on the base of said second transistor is for varying said bias by a selective increment so that the pulse signal magnitude required to trigger said second transistor varies by the ratio of said increment with respect to the voltage gain from the base of said first transistor to the base of said second transistor.

6. An amplifying monostable multivibrator comprising in combiantion:
   - first and second transistors of the same conductivity type and having respective bases, emitters, and collectors;
   - a reactive coupling between said emitters;
   - a first resistor connected between the emitter of said first transistor and a bias terminal connectable to a source of a first potential of predetermined magnitude and polarity;
   - a second resistor having an ohmic value of at least an order of magnitude less than the ohmic value of said first resistor, and connected between the emitter of said second transistor and said bias terminal;
   - a voltage dividing network connectable between a terminal at said first potential and system ground, and being at an intermediate point therein to the base of said first transistor;
   - a reactive coupling between the collector of said first transistor and the base of said second transistor;
   - a third resistor having an impedance substantially the same as the input impedance to the base of said second transistor and being connected between the collector of said first transistor and system ground;
   - a clamp diode connected between said collector of said first transistor and a terminal connectable to a source of a second potential of the same polarity as and of a lesser magnitude than said first potential; and
   - a fourth resistor having an ohmic value several orders of magnitude greater than said third resistor and being connected between the base of said second transistor and a terminal at said first potential.

7. An amplifying monostable multivibrator as defined in claim 6 wherein said second potential is of the same order of magnitude yet greater than the potential present on said collector when said first transistor is in conduction with no transient signal at the base thereof.

8. An amplifying monostable multivibrator as defined in claim 6 wherein said transistors are both npn type and said potentials are negative.

9. An amplifying monostable multivibrator as defined in claim 6 including a system input terminal, a reactance for filtering out low frequency components from an input signal applied to said input terminal, said reactance being said input terminal and the base of said first transistor.

References Cited by the Examiner

UNITED STATES PATENTS

| | | | |
|---|---|---|---|
| 2,688,078 | 8/1954 | Bess | 328—207 |
| 2,942,207 | 6/1960 | Dunwoodie et al. | 328—203 X |
| 3,184,604 | 5/1965 | Hale | 307—88.5 |
| 3,249,767 | 5/1966 | Zeller | 307—88.5 |

DAVID J. GALVIN, *Primary Examiner.*

J. S. HEYMAN, *Assistant Examiner.*